(12) United States Patent
Bobbe et al.

(10) Patent No.: US 6,677,022 B2
(45) Date of Patent: Jan. 13, 2004

(54) INTEGRATED WATERPROOF CARD OR LABEL AND METHOD THEREOF

(75) Inventors: Kenneth Edward Bobbe, Inverness, IL (US); David E. Washburn, Kettering, OH (US)

(73) Assignee: The Standard Register Company, Dayton, OH (US)

( * ) Notice: Subject to any disclaimer, the term of this patent is extended or adjusted under 35 U.S.C. 154(b) by 45 days.

(21) Appl. No.: 09/862,644

(22) Filed: May 22, 2001

(65) Prior Publication Data

US 2003/0180492 A1 Sep. 25, 2003

(51) Int. Cl.[7] .................................................. G09F 3/02
(52) U.S. Cl. ...................... 428/40.1; 283/75; 283/81; 283/101; 283/105; 428/41.3; 428/41.5; 428/41.6; 428/41.7; 428/41.8; 428/42.1; 428/42.2; 428/42.3; 428/43
(58) Field of Search ................ 428/40.1, 41.3, 428/41.5, 41.6, 41.7, 41.8, 42.1, 42.2, 42.3, 43; 283/81, 101, 75, 105

(56) References Cited

U.S. PATENT DOCUMENTS

| | | |
|---|---|---|
| 4,128,437 A | 12/1978 | Ura et al. |
| 4,237,185 A | 12/1980 | Lombardi et al. |
| 4,271,227 A | 6/1981 | Muller et al. |
| 4,416,950 A | 11/1983 | Muller et al. |
| 4,569,888 A | 2/1986 | Muller et al. |
| 4,589,687 A | 5/1986 | Hannon |
| 4,804,827 A | 2/1989 | Jung |
| 5,055,354 A | 10/1991 | Simcoke |
| 5,207,871 A | 5/1993 | Murphy et al. |
| 5,418,205 A | 5/1995 | Mehta et al. |
| 5,518,787 A | 5/1996 | Konkol |
| 5,534,320 A | 7/1996 | Raby |
| 5,662,976 A | 9/1997 | Popat et al. |
| 5,840,143 A | 11/1998 | Swanson |
| 5,888,622 A | 3/1999 | Pinell et al. |
| 5,895,074 A | 4/1999 | Chess et al. |
| 5,915,733 A | 6/1999 | Schnitzer et al. |
| 6,027,597 A | 2/2000 | Main |
| 6,054,170 A | 4/2000 | Chess et al. |
| 6,103,355 A | 8/2000 | Mehta |
| 6,143,120 A | 11/2000 | Mehta et al. |

Primary Examiner—Nasser Ahmad
(74) Attorney, Agent, or Firm—Dinsmore & Shohl LLP

(57) ABSTRACT

A form comprises a cellulosic sheet having a perforation defining a first portion and a second portion. The first portion may define either a card or alternatively a label, and is impregnated with a waterproofing polymerizable composition. The first portion is preferably resistant to water, and is receptive to inks. As such, user variable indicia may be applied anywhere on the sheet including the first portion. For applications requiring a label, an adhesive and liner ply may be applied to the back of the sheet. The liner ply includes a release coating in register with the first portion defining the label, such that, upon removing the label from the sheet, a substantial portion of the adhesive remains with the label.

22 Claims, 3 Drawing Sheets

INTEGRATED WATERPROOF CARD OR LABEL AND METHOD THEREOF

BACKGROUND OF THE INVENTION

The present invention relates in general to a business form and in particular to a form having an integrated, waterproof card or label.

Numerous industries have recognized the utility in providing durable cards for a variety of purposes including conventional identification, insurance identification, group or membership identification, or for any number of other purposes. Traditionally, the card is constructed of a plastic material and is affixed to a paper business form for dissemination.

One such card construction includes a form having a 'blow on' or 'tip on' of a plastic identification card, using for example, a lift dry adhesive. The form, including the affixed card, is fed through a dot matrix printer for customization. However, the card may peel or become loosened jamming the printer. Further, the thickness of the card affixed to the form limits the height to which these forms may be stacked because the form including the card is not planar. The non-planar nature of such cards limits the amount of forms that may be sheet fed into a printing device without operator intervention. Additionally, the affixed card provides an edge on which other forms and process machinery may catch. This can damage the forms, and further may require stoppage of machinery to clear jams and the like. Further, certain plastic cards cannot be printed upon using ink jet and laser jet printers. Rather, such plastic cards require embossing of information into the card itself. This is relatively expensive and makes it difficult to customize the card.

An alternative approach to utilizing plastic cards is to provide a paper sheet that has been laminated with a plastic film to create the card. An adhesive is applied to the face of the form, and a laminate material is placed over the adhesive. The form is then calendered to reduce the thickness of the laminated portions. However, this construction is known to curl due to exposure of the plastic laminate to the heat of the laser printer. Further, the form is known to delaminate when the form is stored for excessive time periods. Unfortunately, not all plastic films or laminates accept toner easily, making it difficult to apply user variable indicia thus limiting the ability of a user or manufacturer to add or change information printed onto the card subsequent to lamination.

The present inventors have recognized that there are numerous useful applications for a form having a waterproof label portion that can easily receive user variable printing. Accordingly, there is a need for a low cost, durable, laser imageable form including an integrated waterproof card or label.

SUMMARY OF THE INVENTION

The present invention overcomes the disadvantages of previously known forms having detachable cards by providing a cellulosic sheet having a first portion and a second portion. The first portion defines a card or alternatively a label, and is impregnated with a waterproofing polymerizable composition. Preferably, the first portion is resistant to water, and is receptive to inks. As such, user variable indicia may be applied anywhere on the sheet including the first portion. Further, the sheet is preferably substantially planar, thus problems with stacking and feeding the forms in sheet feeders of printers is greatly reduced. Lines of weakness preferably define the perimeter for the first portion. The lines of weakness may comprise scores, die cuts, perforations, ties, or any other technique as is known in the art arranged to enable a user to more easily separate the first portion from the second portion.

For applications requiring a label, an adhesive and liner ply may be applied to the back of the sheet. The liner ply is provided to protect and cover the adhesive until the label is ready for use. Preferably, the adhesive and liner ply cover at least the first portion of the sheet.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals, and in which.

DETAILED DESCRIPTION OF THE PREFERRED EMBODIMENTS

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that logical, chemical, and mechanical changes may be made without departing from the spirit and scope of the present invention. Further, the drawings are diagrammatic and as such, are not drawn to scale. Reference is made generally to FIGS. 1–5 where like elements are referenced with like numerals.

Figure 1:
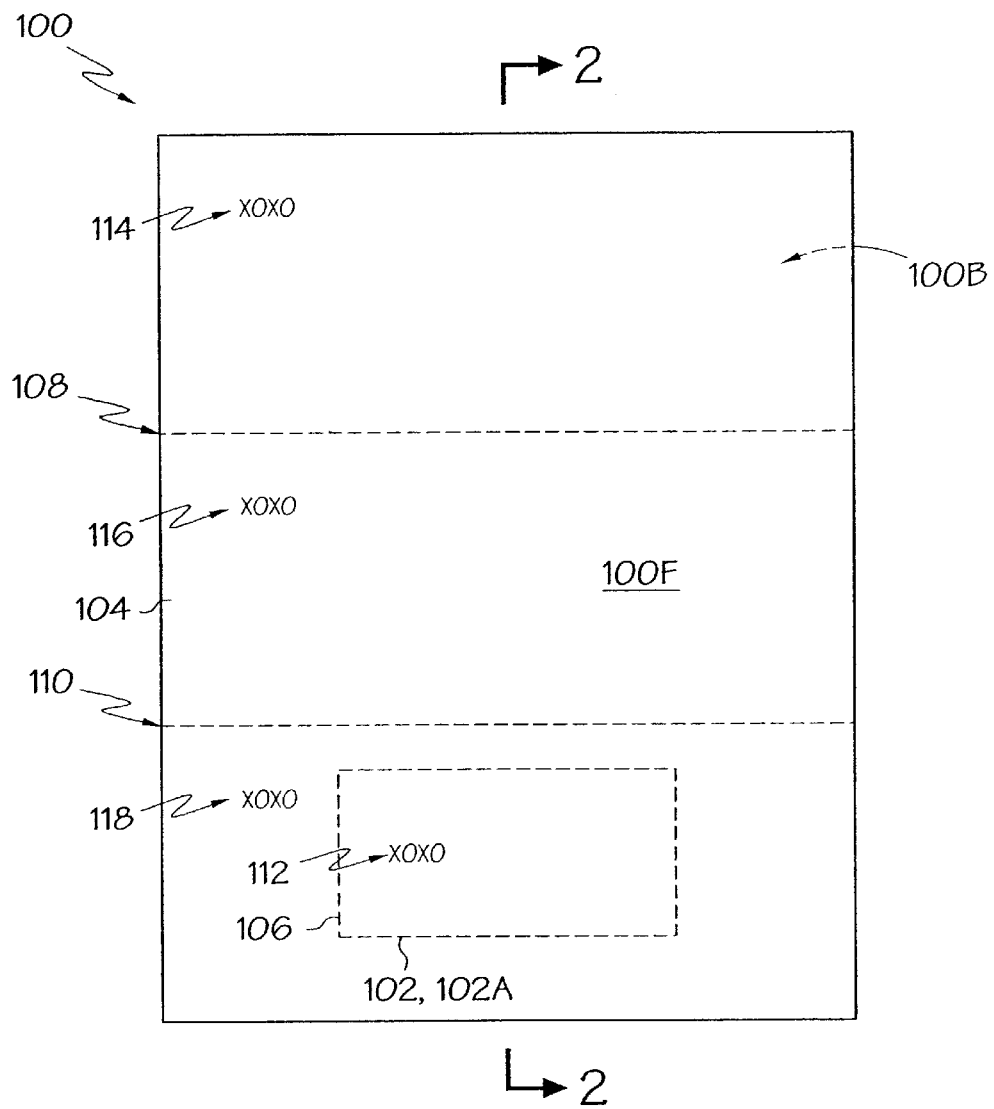
FIG. 1 is a plan view of the front side of a first embodiment of the form of the present invention.

A form including an integrated card according to the present invention is 5 illustrated in FIG. 1. A sheet 100 has a face 100F and a back 100B. The sheet 100 is constructed from a cellulosic substrate, and has at least a first portion 102 and a second portion 104. As illustrated in FIG. 1, the first portion 102 defines a card 102A. It should be appreciated by those skilled in the art that, while the sheet 100 is illustrated with only one card 102A, any number of cards 102A may be provided, depending upon user requirements. Further, the size, shape and position of the card 102A on the sheet 100, can vary depending upon the particular application. The card 102A is treated with a composition suitable for providing water proof characteristics as is more fully explained herein.

Lines of weakness 106 define the perimeter of the card 102A. Lines of weakness 106 may comprise scores, die cuts, perforations, ties, or any other technique as is known in the art arranged to enable a user to more easily separate the card 102A from the remainder of the sheet 100. For example, the lines of weakness 106 may comprise perforations having a closed, continuous die cut in the sheet 100. Preferably, the die cut leaves just enough uncut ties to prevent the card 102A from releasing from the sheet 100 prematurely, such as when passing through a printer or other processing machinery. The die cut may optionally be flattened out by mechanical means for example, to improve laser printer feeding and printing. It shall be understood that while lines of weakness 106 do assist the user in separating the card 102A from the remainder of the sheet 100, such lines of weakness 106 are not required to practice the present invention.

Once the card 102A is suitably imaged upon and delivered to a recipient, the recipient breaks the uncut ties releasing the card 102A from the sheet 100. As an alternative to a die cut, a letteredge/perforation cut outlining the outer edge, or perimeter of the card 102A may be used.

The sheet 100 may also include other construction techniques as known in the art. For example, the sheet 100 may include fold lines 108 and 110. Further, fixed and/or user variable indicia 112 suitable for the intended application may appear anywhere on the card 102A, and indicia 114, 116, 118 may appear anywhere on the second portion 104. Fixed indicia is information that remains the same from one sheet to the next in a series of sheets. User variable indicia is information unique to a particular sheet.

Figure 2:
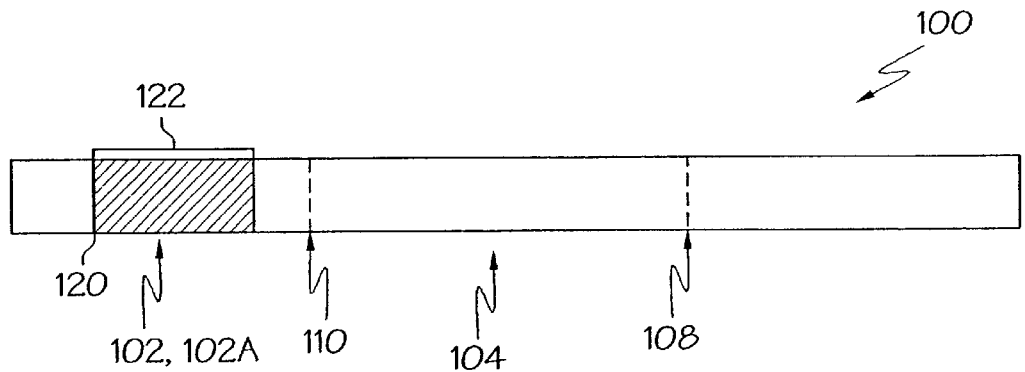
FIG. 2 is a diagrammatic view illustrating a cross section of the form of FIG. 1 as seen along the Line 2—2.

A cross sectional view of the sheet 100 taken along Line 2—2 is shown in FIG. 2. The sheet 100 is treated within the area defining the card 102A, with a waterproofing polymerizable composition 120 suitable for providing waterproof characteristics. Examples of suitable compositions are illustrated in U.S. Pat. Nos. 5,418,205 and 6,143,120 to Mehta et al., and U.S. Pat. No. 6,103,355 to Mehta, the disclosures of which are incorporated herein by reference. The card 102A is illustrated in FIG. 2 with diagonal lines to indicate that the waterproofing polymerizable composition 120 impregnates, or penetrates entirely through the card 102A. Further, it shall be understood that the waterproofing polymerizable composition 120 need not penetrate the sheet 100 entirely, so long as the card 102A exhibits suitable waterproof characteristics for a particular application. Also, upon treating the card 102A with the waterproofing polymerizable composition 120, the thickness of the card 102A need not be identical to the thickness of the remainder of the sheet 100. For example, the card 102A may have a thickness less than the thickness of the remainder of the sheet 100. Preferably, there are no edges that may get caught in printers or other processing machinery. Further, it shall be observed that where the thickness of the card 102A is the same as, or less than the remainder of the sheet 100, numerous ones of sheet 100 can be placed in tall, stable stacks.

The waterproofing polymerizable composition 120 may comprise any number of compositions so long as suitable waterproofing characteristics are achieved for the intended application. For example, the waterproofing polymerizable composition 120 comprises a free-radical catalyzable constituent, a cationic catalyzable constituent, and a catalyst.

Free-radical catalyzable constituents comprise by way of example acrylate and methacrylate esters of polyhydric alcohol, such as acrylate and/or methacrylate esters of hydroxy polyethers made by reaction of ethylene and/or propylene oxide with organic compounds having one or more reactive sites, the reactive sites comprising hydroxyl and primary or secondary amine groups. Such monomers are aliphatic, having at least one ethylenically unsaturated group. Examples of suitable compounds include but are not limited to ethylene glycol diacrylate, ethylene glycol dimethacrylate, pentaerythritol tetramethacrylate, dipentaerythritol hydroxy pentacrylate, pentacrylate, diethylene glycol dimethacrylate, 1,6-hexane diacrylate, trimethylolpropane triacrylate, and tripropyleneglycol diacrylate, all of which are commercially available or readily prepared by techniques and procedures well known to one of ordinary skill in the art. For example, tripropylene glycol diacrylate is available from Sartomer or Radcure and pentacrylate is available as SR-2041 from Sartomer. It shall be understood that the compounds of above examples, as well as other suitable compounds may be used in the waterproofing polymerizable composition 120 as individual compounds or as mixtures of compounds.

Cationic catalyzable constituents include by way of example vinyl ether, a polyepoxide, a mixture of vinyl ethers, a mixture of polyepoxides, or a mixture of at least one vinyl ether and at least one polyepoxide. Suitable vinyl ethers for use in the waterproofing polymerizable composition 120 include, but are not limited to, vinyl pyrrolidone, hydroxybutyl vinyl ether, cyclohexandimethanol divinyl ether, polyester vinyl ether, fluoroalkyl vinyl ether, urethane divinyl ether, triethyleneglycol divinyl ether, vinyl/ether terminated urethane monomers and oligomers, and vinyl ether terminated ester monomers and oligomers. These vinyl ethers may be used in the waterproofing polymerizable composition 120 as individual vinyl ethers or mixtures of vinyl ethers. Suitable polyepoxides for use in waterproofing polymerizable composition 120 include, but are not limited to cycloaliphatic polyepoxides. Cycloaliphatic polyepoxides are either commercially available or readily prepared by methods well known to those skilled in the art. For example, cycloaliphatic polyepoxide 1 is available as UVR-6110 from Union Carbide. Linear cycloaliphatic diepoxides 3 are available from UCB Chemical Group, under the tradename E-CADE. Methyl hydroxy cycloaliphatic epoxide 2 is available as ETHB from UCB Chemical Group. It Cycloaliphatic polyepoxides may be used in the waterproofing polymerizable composition 120 as individual cycloaliphatic polyepoxides or as mixtures of cycloaliphatic polyepoxides.

The catalyst may include by way of example a photocatalyst including a free radical catalyst, a mixture of free radical catalysts, a living cationic catalyst, or mixture of living cationic catalysts, or mixture of at least one free radical catalyst and at least one living cationic catalyst. A wide variety of free-radical catalysts can be used provided they do not deleteriously affect the desired physical and chemical properties of the waterproofing polymerizable portion 120. Suitable free radical catalysts for use in the present invention include, but are not limited to, xanthones, such as benzoin, ether, benzyldimethoxy ketone, acetophenones, such as 2,2 diethoxyacetophenone and t-butyl trichloroacetophenone, alkyl benzoin ethers, such as benzoin ether benzophenone, a benzophenone with an amine, such as methyl diethanolaminedimethylquinoxiline, 4,4'-bis (dimethylaminebenzophenone) and chloroacetophenone. A preferred class of useful free radical photocatalysts are haloalkyl substituted aryl ketone compounds. All such photocatalysts, useful in the practice of this invention, are either readily available commercially or are easily prepared using known techniques. For example, free radical catalyst 2-hydroxy-1-[4-(hydroxy-ethoxy)phenyl]-2-methyl-1-propane is available as Iracure 2959 from Ciba Geigy. The free radical catalysts may be used in the waterproofing polymerizable composition 120 as individual free radical catalysts or as mixtures of free radical catalysts. Suitable living cationic catalysts for use in the present invention may be chosen for example from the family of triarylsulfonium salts or the family of diaryl iodonium salts.

The waterproofing polymerizable composition 120 penetrates the sheet 100 rapidly, without using oligomers or prepolymers, and may be applied as a "100% solids". By "100% solids" it is meant that the waterproofing polymerizable composition 120 may be applied as a liquid that can be converted 100% to a solid upon crosslinking or polymerization. As such, the waterproofing polymerizable composition 120 contains no residual solvents. However, faster penetration may be achieved by using a catalyst comprising an organic solvent, and preferably an organic solvent that is polar and miscible with water, such as isopropanol, methanol, ethanol, or acetone. Other suitable examples include methyl ethyl ketone, toluene, or hexyl carbitol (hexyl ether of diethylene glycol). To provide extra flexibility to the card 102A, an oligomer may optionally be included. The preferred oligomers include urethane acrylate oligomer and styrene-acrylate oligomer. It should be appreciated that other waterproofing materials may be used, however resultant curl may affect results. For example, the waterproofing polymerizable composition 120 may comprise a composition that cures upon contact with a cellulosic substrate or that cures by other means. Among the commonly known means are thermal cure and two component reactive systems that cross-link on contact, and curing by ultra-violet radiation. Further, while the card 102A is more resistant to water damage than uncoated paper, the card 102A may not be any more resistant to tearing.

Depending upon the selection of the waterproofing polymerizable composition 120, the card 102A may transparentize when suitably cured. However, it may be desirable that the card 102A be of a particular color. For example, where the sheet 100 is generally white, it may be desirable that the card 102A be white as well to minimize the appearance of the card 102A with respect to the remainder of the sheet 100. For opacity, the card 102A is overprinted with a pigmented ink 122. It should be appreciated that the thickness of the overprinted pigmented ink 122 in FIG. 2 is exaggerated for illustrative purposes. The pigmented ink 122 applied to the face 102F of the sheet 100 comprises a thin coating such that the sheet 100 is substantially planar. Because the waterproofing polymerizable composition 120 completely saturates the sheet 100 within the area defining the card 102A, it is preferable that the pigmented ink 122 comprise a UV curable ink, or an ink otherwise compatible with plastic surfaces. As an alternative to overprinting the card 102A with a pigmented ink 122, the waterproofing polymerizable composition 120 may be pigmented or contain a pigmented ink. For example, the waterproofing polymerizable composition 120 may comprise a coloring agent or a UV ink, such that the ink impregnates the sheet 100 integral with the waterproofing polymerizable composition 120. It should be observed that where the waterproofing polymerizable composition 120 contains pigment, a separate coating of a pigmented ink 122 is unnecessary. Further, in addition to using a pigmented ink, an overcoat containing a pigment may be used.

In application, a continuous, in-line process can be utilized in which the waterproofing polymerizable composition 120 is applied to first portion 102 defining card 102A, in a printing press. Such a process can include any conventional printing method such as flexographic, gravure, or screen. In this manner, the form may be produced as either a continuous product, or a cut sheet product. The waterproofing polymerizable composition 120 can be applied to one or both sides of card 102A. Simultaneous application is preferred however, because faster penetration of the liquid into the sheet 100 may be realized. Where no thinning of the card 102A is desired, heating may be applied to the sheet 100, and particularly to the card 102A to improve processing. Alternatively, the waterproofing polymerizable composition 120 may be suitably heated prior to being applied to the sheet 100 in the area defining the card 102A. The waterproofing polymerizable composition 120 should be applied to the sheet 100 such that a sufficient quantity is applied for the desired effect, and sufficient time should be allowed for the waterproofing polymerizable composition 120 to saturate the sheet 100 thoroughly.

The waterproofing polymerizable composition 120 impregnating the card 102A is subsequently cured for example, by exposure to high energy, ultraviolet radiation. The preferred wavelength of the ultraviolet curing light is from about 200 to about 400 nanometers, and the preferred ultraviolet curing light capacity is from about 300 to about 400 watts per inch of substrate width. It should be appreciated that a photocatalyst, preferably of the free radical type, may be required to carry out the curing process by exposure of the card 102A to ultraviolet radiation. Examples of such free radical photocatalysts include haloalkyl substituted aryl ketone compounds, but may also include an alkyl benzoin ether, such as benzoin ether benzophenone, a benzophenone with an amine such as methyl diethanolaminedimethylquinoxiline 4,4' bis(dimethylamine bezophenone), and acetophenones such as 2,2 diethoxyacetophenone and t-butyl trichloroacetophenone. A catalyst comprising an amine, trierhanoi amine for example, may further be included with the waterproofing polymerizable composition 120 in order to reduce the curing time thereof. Electron beam radiation may be used as an alternative to ultraviolet curing. Once cured, the card 102A is waterproof, will not migrate or volatilize, and exhibits improved adhesion of laser toner, particularly where the card 102A is uncalendered.

The thickness of the card 102A is not critical to practicing the present invention. The card 102A could have a thickness greater than, or less than, the thickness of the sheet 100. However, it is preferable that the sheet 100 is substantially planar, that is, the card 102A has a thickness which is substantially the same as the thickness of the remainder of the sheet 100. The waterproofing polymerizable composition 120 does not significantly increase the thickness of the sheet 100. As such, numerous ones of the sheet 100 can be placed into stable, tall stacks. In manufacturing and printing operations, tall stacks of sheets are generally more convenient than being limited to short stacks of sheets. Further, because the sheet 100 is planar with no significant build up, sealer equipment such as sealers incorporating full width sealing rolls may be used. The thickness of the card 102A may be reduced, such as by calendering, however, such additional processing may restrict the types of paper suitable for sheet 100. For example, a paper that may bruise or fall apart due to calendering may be used for the sheet 100 so long as the waterproofing polymerizable composition 120 is allowed suitable time to fully saturate the portion of the sheet 100 defining the card 102A.

Figure 3:
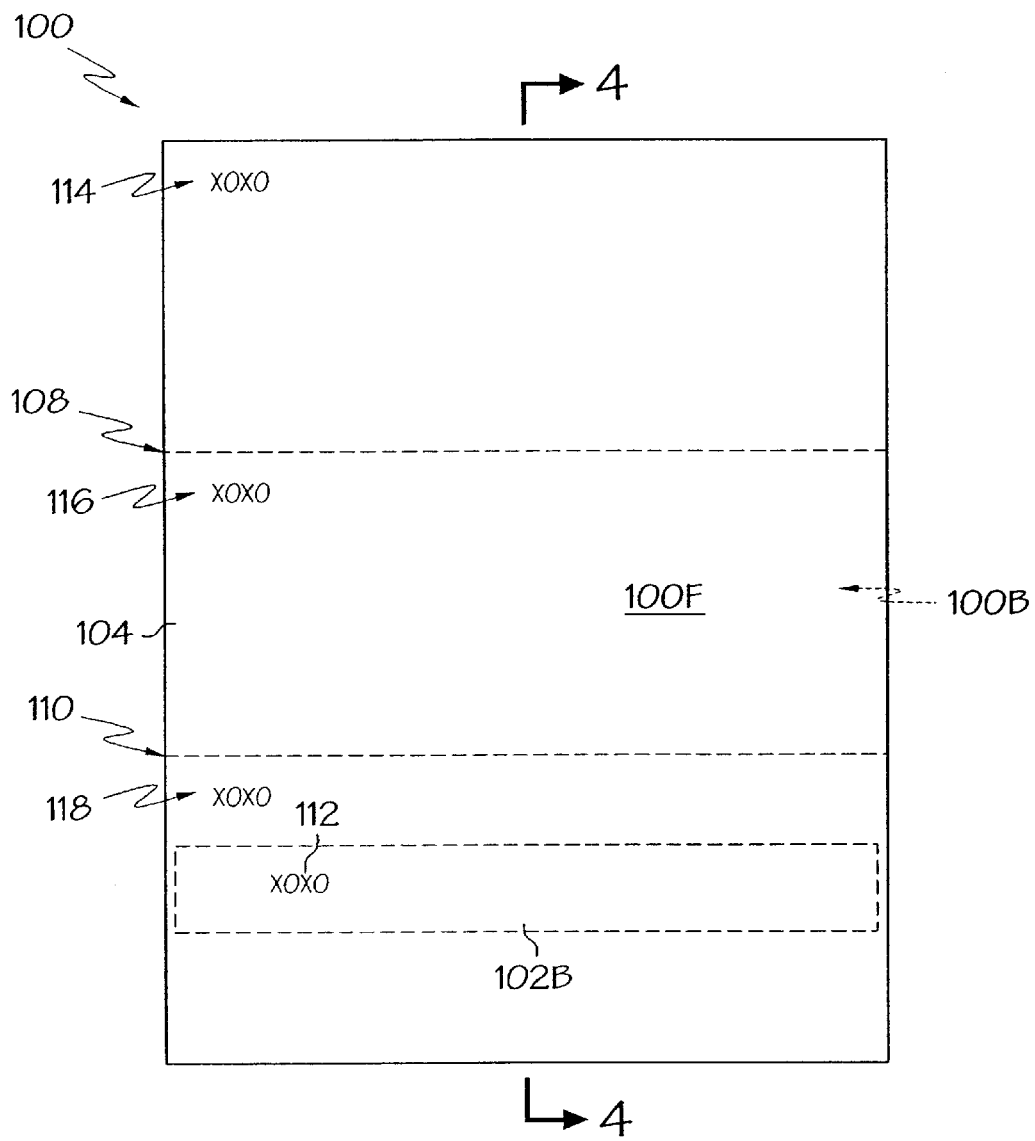
FIG. 3 is a plan view of the front side of a second embodiment of the form of the present invention.
Figure 4:
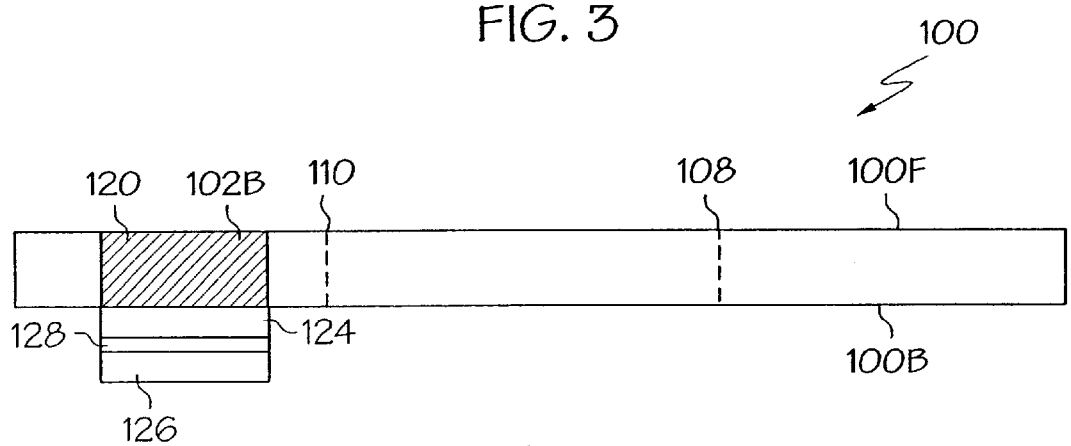
FIG. 4 is a diagrammatic view illustrating a cross section of the form of FIG. 3 as seen along the Line 4—4, where an adhesive and liner ply are applied only a portion of the form; and, FIG. 5 is a diagrammatic view illustrating a cross section of the form of FIG. 3 as seen along the Line 4—4 where the adhesive and liner ply are applied to the entire form.
Figure 5:
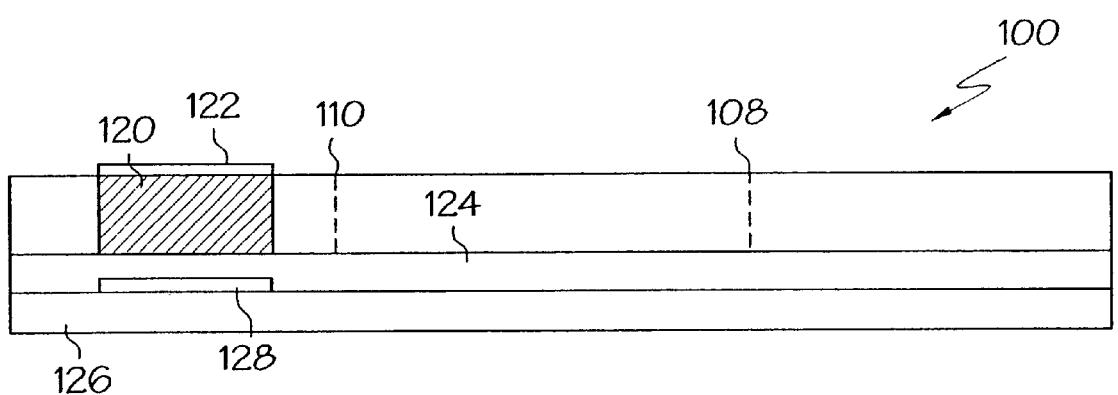

An integrated label comprising the second embodiment of the present invention is illustrated in FIGS. 3–5. Referring initially to FIG. 3, the sheet 100 is substantially the same as in FIG. 1, with the exception that the card 102A as shown in FIG. 1, has been replaced with a label 102B. The sheet 100 may include the use of lines of weakness 106, fold lines 108, 110, and indicia 112, 114, 116, 118 as more fully described herein. It should be appreciated that while one label 102B is illustrated, any number of labels may be provided, depending upon user requirements. Further, the size, shape and position of the label 102B on the sheet 100, can vary depending upon the particular application.

A cross sectional view of the sheet 100 taken along Line 4—4 is shown in FIGS. 4–5. Referring firstly to FIG. 4, the label 102B is treated with a waterproofing polymerizable composition 120 as described above with reference to the card 102A illustrated in FIGS. 1 and 2. As illustrated in FIG. 4, the waterproofing polymerizable composition 120 contains a pigmented ink and as such, no additional coating of inks is required, such as the pigmented ink 122 shown in FIG. 2.

Further, an adhesive 124 is applied to the back 100B of sheet 100 within the portion of the sheet 100 designated as the label 102B. The adhesive 124 may be any number of adhesives depending upon the intended application, including for example, repositionable adhesives, pressure sensitive adhesives, and remoistenable adhesives. A liner ply 126 may be provided to cover and protect the adhesive 124 prior to the application of the label to an intended work surface. The liner ply 126 includes a release coating 128, which is intended to allow a substantial portion of the adhesive 124 to release with the label 102B. The release coating 128 may be any suitable coating as is known in the art, for example silicon or wax based coatings. Further, it should be appreciated that while the adhesive 124 and liner ply 126 are illustrated as encompassing an area greater than that of the label 102B, the adhesive 124 and liner ply 126 may cover any portion of the sheet 100 as required by the particular application, 30 SO long as at least a portion of the back 100B of the label 102B is covered.

Referring to FIG. 5, the adhesive 124 and liner ply 126 may optionally underlie the entire sheet 100, such that the sheet 100 is planar. The release coating 128 is applied to the liner ply 126 only in register with the label 102B. Under this arrangement, the label 102B may be released from the liner ply 126, and a substantial portion of the adhesive 124 will remain with the label 102B. Otherwise, the remainder of the sheet 100 will adhere to the liner ply 126 by adhesive 124 such that the sheet 100 and the liner ply 126 are an integral assembly. The lines of weakness 106 extend through the sheet 100, but not through the liner ply 126. Further, FIG. 5 illustrates the pigmented ink 122 overprinted on the face 100F of the label portion 102B. In FIG. 4, no build up of overprinted ink is present indicating that the pigmented ink is applied as a component of the waterproofing polymerizable composition 120 as more fully described herein.

Having described the invention in detail and by reference to preferred embodiments thereof, it will be apparent that modifications and variations are possible without departing from the scope of the invention defined in the appended claims.

What is claimed is:

1. A form comprising:
a cellulosic sheet having a face, a back, and a first portion, said first portion defining a card readily removable from the remainder of said sheet; and,
a waterproofing polymerizable composition impregnated into substantially the entirety of said first portion.

2. A form according to claim 1, wherein said waterproofing polymerizable composition comprises a free-radical catalyzable constituent, a cationic catalyzable constituent, and a catalyst.

3. A form according to claim 1, wherein said waterproofing polymerizable composition comprises one or more monomers selected from the group consisting of acrylate esters of polyhydric alcohols, methacrylate esters of polyhydric alcohols, and vinyl esters.

4. A form according to claim 1, wherein said waterproofing polymerizable composition comprises a coloring agent such that said card is opaque.

5. A form according to claim 1, further comprising a pigmented ink overcoat applied to the face of said card.

6. A form comprising:
a cellulosic sheet having a face, a back, a first portion defining a label, and lines of weakness arranged such that said label is integral with and readily releasable from the remainder of the sheet
a waterproofing polymerizable composition impregnated into substantially the entirety of said label;
a liner ply; and,
an adhesive applied between said back of said sheet and said liner ply, wherein said label is integral with, and releasable from said sheet.

7. A form according to claim 6, wherein said waterproofing polymerizable composition comprises a free-radical catalyzable constituent, a cationic catalyzable constituent, and a catalyst.

8. A form according to claim 6, wherein said waterproofing polymerizable composition comprises one or more monomers selected from the group consisting of acrylate esters of polyhydric alcohols, methacrylate esters of polyhydric alcohols, and vinyl esters.

9. A form according to claim 6, wherein said waterproofing polymerizable composition comprises a coloring agent such that said label is opaque.

10. A form according to claim 6, further comprising a coloring agent overcoat applied to the face of said label.

11. A form according to claim 6, wherein said liner ply covers substantially the entirety of said back of said sheet.

12. A form comprising:
a cellulosic sheet having a face, a back, a first portion and a second portion;
said first portion defining a card and having:
a waterproofing polymerizable composition impregnated into said card, said waterproofing polymerizable composition comprising a free-radical catalyzable constituent, a cationic catalyzable constituent, and a catalyst; and,
a coloring agent, wherein said sheet further comprises lines of weakness arranged such that said card is integral with and readily releasable from the remainder of said sheet.

13. A form according to claim 12, wherein said coloring agent comprises a pigmented ink in said waterproofing polymerizable composition.

14. A form according to claim 12, wherein said coloring agent comprises a pigmented ink overcoat applied to the face of said card.

15. A form according to claim 12, wherein said waterproofing polymerizable composition impregnates substantially the entirety of said card.

16. A form according to claim 12, wherein said card has a perimeter, and lines of weakness are arranged around said perimeter such that said card is integral with and readily releasable from the remainder of said sheet.

17. A form comprising:
a cellulosic sheet having a face, a back, a first portion and a second portion;
said first portion defining a label having:
a waterproofing polymerizable composition impregnated into said label, said waterproofing polymerizable composition comprising a free-radical catalyz able constituent, a cationic catalyzable constituent, and a catalyst; and, a coloring agent;

a liner ply; and, a coating of an adhesive between said back of said sheet and said liner ply, said adhesive coating at least a portion of said label, wherein said sheet further comprises line of weakness arranged such that said label is integral with and readily releasable from the remainder of the sheet.

18. A form according to claim 17, wherein said liner ply covers only said label.

19. A form according to claim 17, wherein said liner ply covers substantially the entirety of said back of said sheet, said liner ply having a release coating substantially in register with said label.

20. A form according to claim 17, wherein said coloring agent comprises a pigmented ink in said waterproofing polymerizable composition.

21. A form according to claim 17, wherein said coloring agent comprises a pigmented ink overcoat applied to the face of said label.

22. A form according to claim 17, wherein said label has a perimeter, and lines of weakness are arranged around said perimeter such that said label is integral with and readily releasable from the remainder of said sheet.

* * * * *